No. 791,336. PATENTED MAY 30, 1905.
M. FORTUNY.
APPARATUS FOR THE PRODUCTION OF STAGE EFFECTS.
APPLICATION FILED NOV. 4, 1901.

2 SHEETS—SHEET 1.

Witnesses

Inventor
Mariano Fortuny
By James L. Norris
Atty

No. 791,336. PATENTED MAY 30, 1905.
M. FORTUNY.
APPARATUS FOR THE PRODUCTION OF STAGE EFFECTS.
APPLICATION FILED NOV. 4, 1901.

2 SHEETS—SHEET 2.

Witnesses,
Inventor
Mariano Fortuny
By James L. Norris
Atty.

No. 791,336. Patented May 30, 1905.

UNITED STATES PATENT OFFICE.

MARIANO FORTUNY, OF VENICE, ITALY.

APPARATUS FOR THE PRODUCTION OF STAGE EFFECTS.

SPECIFICATION forming part of Letters Patent No. 791,336, dated May 30, 1905.

Application filed November 4, 1901. Serial No. 81,137.

*To all whom it may concern:*

Be it known that I, MARIANO FORTUNY, a subject of the King of Spain, residing at Venice, Italy, have invented a new apparatus for the production of stage effects to be used in conjunction with the system of stage illumination with indirect light forming the subject-matter of my United States application, Serial No. 56,629, filed April 19, 1901, (for which new method I have applied for a patent of addition of the Kingdom of Italy on August 16, 1901,) of which the following is a full and clear specification.

The object of this invention is to provide means whereby the numerous and costly pieces of stage-scenery which are at present in use may be dispensed with and at the same time to enable a greater number and variety of scenic effects to be readily obtained at a comparatively small cost.

This invention consists in projecting upon a screen or scenic canvas an image of the scene desired, the projection being effected by reflecting light onto a scenic canvas from a reflecting-screen, having the scene painted on it with a transparent medium, and in combining this process with that described in the earlier application for patent above referred to. There is thus obtained a new process of stage illumination and scene-painting by reflected light admitting of coloring and animating the pictures. This process effects great economy over existing methods of scenic representation, as only one screen is required to depict any number of different scenes.

If the screen on which the scenery is projected is in the shape of a quarter-sphere, or even of a semicircle, with the concave side toward the spectators, very realistic effects are obtained, and the necessity of having lateral screen-frames or screens in front of the main screen is done away with.

Figure 1:
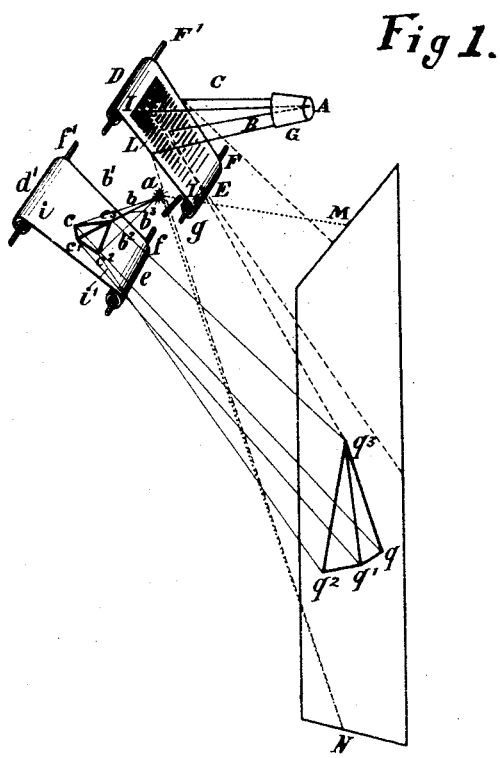
Figure 2:
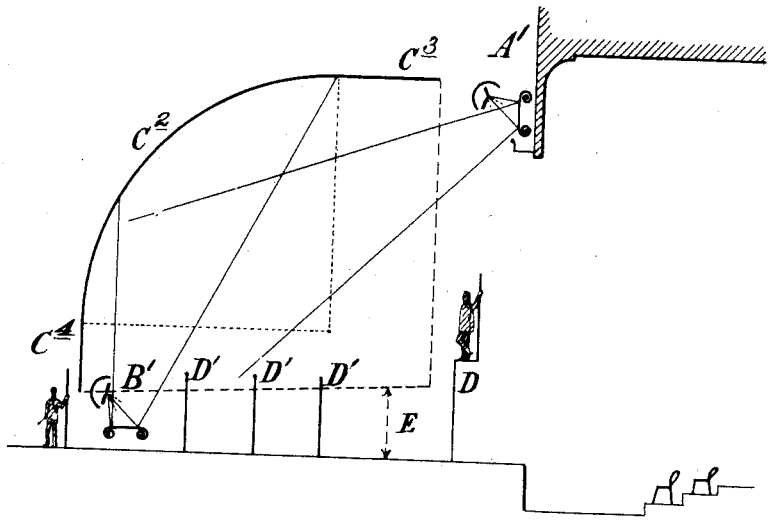
Figure 3:
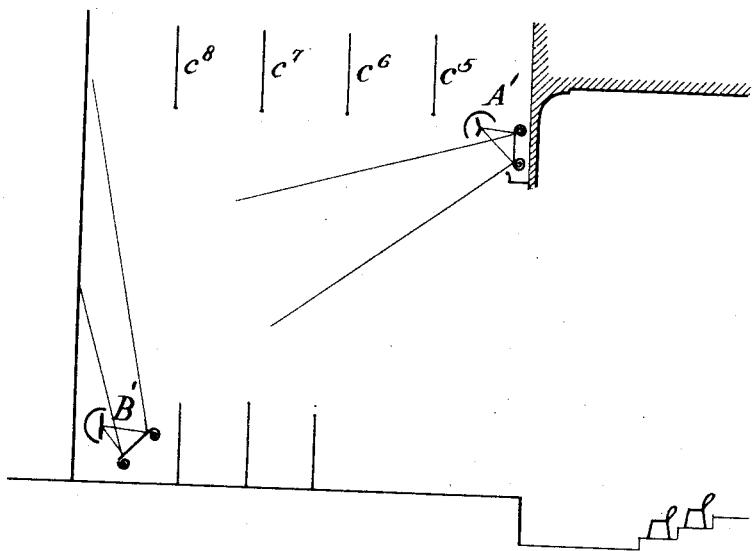

Referring to the accompanying drawings, Figure 1 illustrates a diagrammatical view of one form of an apparatus for carrying the invention into effect, and Figs. 2 and 3 are like views of modified forms.

The rays of light emanating from a suitable source A are reflected from the parabolic mirror G onto the zone I I' of a roughened screen D E, which in turn reflects the light in a diffused state onto the screen M N. The screen D E is wound on rollers E F', one of which is revolved so as to cause the screen to traverse the path of the illuminating-rays, thus presenting successively a variety of colored surfaces to these rays, and thereby alternating the shade or color of light thrown on the screen M N, as already described in the former specification above referred to. A second reflecting-screen $d'\, e$ is provided, upon which the scenic picture is painted in suitable transparent coloring medium, or the picture may be put on the screen in the form of an uncolored transparency or photographic transfer. A small but very intense source of light $a$ is placed so that its rays strike the screen $d'\, e$, from which they are again reflected onto the scene-canvas M N, direct illumination of the canvas being prevented by an opaque screen $g$. The light in being reflected from the screen $d'\, e$ becomes colored in its passage through the transparent coloring medium upon the screen $d'\, e$, and thus a magnified image of the picture on the screen $d'\, e$ is projected on the large screen M N. In the figures, $c\, c'\, c^2\, c^3$ represent a design which is delineated in transparent color, and $q\, q'\, q^2\, q^3$ represent the image which is thrown by reflection of the rays $b\, b'\, b^2\, b^3$ onto the screen M N, which is already tinted by the light reflected from the roughened and colored screen D E.

The screen $d'\, e$ may be painted with a variety of scenes, each of which is thrown on the screen M N as it comes into the illuminated zone $i\, i'$, movement being given to the screen by means of the rollers $f\, f'$.

Referring to Fig. 2, $c^2$ represents the spherical surface. $c^3\, c^4$ are its cylindrical prolongations. E is the height reserved for the passage of the actors. D' represents painted sheets (or leaves) of the scenery. A' and B' are the illuminating groups.

Referring to Fig. 3, the arrangement of the appliances is the same as for the illumination of the spherical surface. This is a case of an ordinary flat scene, with the difference that the arrangement in Fig. 1 presents the advantage of obviating the streaks of light $c^5\, c^6\, c^7\, c^8$, which, in addition to producing a more artistic effect, has the advantage of being more economical.

In both Figs. 2 and 3, A' represents an illumination from above downward, while B' represents an illumination from below upward.

The couples of stage and scenic illuminating groups, as above described, are placed at the same points of the stage at which are usually placed the lamps for lighting the stage, the number and distribution of such couples being arranged according to requirements.

Supposing that it is desired to reproduce a perfectly blue sky with rose clouds on a light and uniform screen, the blue is obtained by projecting, by means of the rough screen colored in blue, a diffused light of that color, and the rose clouds are produced by the screen d' e, bearing a transparent picture of the rose clouds.

It is to be observed that according to the intensity of the light and to the reflecting power given to the image such image will more or less efface or destroy the blue tint on the screen or blend with it, producing an effect difficult to obtain otherwise, and if there are several reflectors the blending of their respective colors and images produces very varied combinations suitable for many purposes.

By suitable arrangement of the screens the same source of light may be used for both screens.

As the windows at the back of a theater stage are usually high up or low down on the side or back walls, this apparatus may be used with natural instead of artificial light or one reflector may be used to reflect the natural daylight, while the other reflects artificial light.

Having now fully described my said invention and the manner in which the same is to be performed, I declare that what I claim as my invention is—

1. In an apparatus for producing scenic effects, the combination with a suitable canvas or screen, of a movable reflector having an irregular surface diversely colored and adapted to reflect the light from a suitable source into a diffused state onto said screen or canvas, and a non-transparent reflecting-surface provided with a transparent representation and upon which the light from a suitable source is directed and then reflected through the said representation onto said screen or canvas.

2. In an apparatus for producing scenic effects, the combination with a suitable canvas or screen, of a movable reflector having an irregular surface diversely colored and adapted to reflect the light from a suitable source into a diffused state onto said screen or canvas, and a movable non-transparent reflecting-surface provided with a transparent representation and upon which the light from a suitable source is directed and then reflected through the said representation onto said screen or canvas.

3. An apparatus for producing scenic effects, comprising the combination with a suitable canvas or screen, of a non-transparent reflecting-surface provided with a transparent representation and upon which light from a suitable source is directed and then reflected through said representation on said screen or canvas.

In witness whereof I have hereunto set my signature in the presence of two witnesses.

MARIANO FORTUNY.

Witnesses:
S. V. ZURNAND,
GUY C. TERRON.